United States Patent Office 2,883,408
Patented Apr. 21, 1959

2,883,408

LOWER ALKYL MERCURY SALTS OF HYDROXY-LOWER-ALKYL MERCAPTANS

Albert L. Flenner, Wilmington, Del., assignor to E. I. du Pont de Nemours and Company, Wilmington, Del., a corporation of Delaware No Drawing. Application April 1, 1955
Serial No. 498,755

5 Claims. (Cl. 260—431)

This invention relates to lower organo mercury salts of hydroxyalkyl polymercaptans and their use as fungicides, especially as seed disinfectants.

The term "lower" as used herein to describe organic radicals is used in the customary sense, that is, as including radicals containing not more than six carbon atoms.

The lower organo group of my lower organo mercury salts of hydroxyalkyl polymercaptans can be a lower aromatic or a lower cyclic or acyclic aliphatic monovalent radical which can be either unsubstituted or substituted with any of a wide variety of substituents.

Thus the lower organo group can be a lower aromatic, either substituted or unsubstituted, such as phenyl, nitrophenyl, hydroxyphenyl, cyanophenyl, chlorophenyl, dichlorophenyl, fluorophenyl, pyranyl, pyridyl, nitropyridyl, chloropyridyl, cyanopyridyl, fluoropyridyl, hydroxypyridyl or methoxypyridyl.

Likewise, the lower organo group can be a lower acyclic aliphatic radical such as a lower alkyl or a lower alkenyl, either of which can be widely substituted. For example, the lower organo group as a lower alkyl can be methyl, ethyl, propyl, butyl, hexyl, nitromethyl, hydroxybutyl, cyanohexyl, chloroethyl, bromomethyl, methoxyethyl or methoxypropyl. The lower organo group as a lower alkenyl can be vinyl, allyl, hydroxybutenyl, chlorovinyl, pentenyl or fluoropentenyl.

Or, the lower organo group can be a lower cyclic aliphatic radical such as cyclobutyl, cyclopentyl, cyclohexyl, hydroxycyclobutyl, cyanocyclopentyl, dichlorocyclohexyl, hydroxycyclohexyl, bromocyclobutyl, iodocyclopentyl or cyanocyclohexyl.

The hydroxyalkyl polymercaptans of my compounds are those containing 2 or 3 mercapto groups. They are hydroxylated in one or more positions, and can be hydroxylated cyclic or acyclic alkyl polymercaptans. Thus, the hydroxyalkyl polymercaptan can be a hydroxyalkyl polymercaptan such as 2,3,4-trihydroxypentamethylenedithiol, 3 - hydroxypropylenedithiol, 2,2 - bis(hydroxymethyl)trimethylenedithiol or 1-(9-hydroxynonyl)-2-heptylethylenedithiol. Or, the hydroxypolymercaptan can be a hydroxycycloalkyl polymercaptan such as 4-(hydroxymethyl)-1,2,3-cyclohexanetrithiol.

While the lower organo mercury salts of long chain hydroxyalkyl polymercaptans, such as the salts of 1-(9-hydroxynonyl-2-heptylethylenedithiol, can be used satisfactorily in fungicidal compositions, it is preferred to use lower organo mercury salts of lower hydroxyalkyl polymercaptans, that is alkyl polymercaptans containing from 2 to 6 carbon atoms and 2 or 3 mercapto groups.

Of all the above-described compounds, by far the most preferred are the lower alkyl mercury salts of hydroxy lower alkyl polymercaptans in which each carbon atom of the alkyl polymercaptan is substituted with either a hydroxyl group or a mercapto group, the polymercaptan containing 2 or 3 mercapto groups.

Of these most preferred compounds, the most desirable ones are the lower alkyl mercury salts of 3-hydroxypropylenedithiol. These compounds are made from reactants that are in general readily prepared, relatively inexpensive and commercially available. They are extremely effective as fungicides. For these reasons they are ideally suited for inclusion in fungicidal compositions.

My organo mercury salts of hydroxyalkyl polymercaptans are readily made by reacting a lower organo mercury salt or hydroxide with a hydroxyalkyl polymercaptan.

The hydroxy polymercaptans used in preparing my compounds can be prepared by reacting the corresponding polyhalide with an alcoholic solution of sodium or potassium hydrosulfide (NaSH or KSH) in the conventional manner, that is under pressure and at a slightly elevated temperature, such as 65° C. The polyhalides can be prepared in any conventional manner, such as by the addition of halogen to the corresponding unsaturated organic compound.

In general, the fungicidal compositions of my invention contain in sufficient amounts to exert fungicidal action, an organo mercury salt of a hydroxyalkyl polymercaptan in admixture with an adjuvant of the type customarily included in fungicidal compositions, such as organic solvents, sticker solvents, wetting agents and/or dyes. In general, the active ingredient is present in these compositions in an amount ranging anywhere from about 0.02% to 95% by weight of the composition, depending on the type of formulation prepared.

The preferred compositions also contain ethylmercury acetate or ethylmercury hydroxide with or without acetic acid.

These compositions can be prepared by adding the organo mercury salt to water and/or alcohol solutions of ethylmercury acetate or ethylmercury hydroxide.

Alternatively, the preferred compositions can be obtained by adding the hydroxyalkyl polymercaptan reactant to solutions containing an excess of ethylmercury acetate or hydroxide. The hydroxyalkyl polymercaptan reactant combines with the ethylmercury acetate to form the ethylmercury salt of the particular hydroxy polymercaptan employed.

The resultant composition contains the excess unreacted ethylmercury reactant as well as the ethylmercury salt of the hydroxyalkyl polymercaptan. Where ethylmercury acetate is employed, the composition also contains the acetic acid that is formed as a product of the hydroxyalkyl polymercaptan-ethylmercury acetate reaction.

Where the composition is to be used for seed treatment, in some cases it has been found desirable to include a sticker solvent of low volatility such as glycols, heavy mineral or vegetable oils, or fish oils. The function of the sticker solvent is to facilitate distribution and retention of the fungicide. Obviously, the solvent should be substantially non-phytotoxic in nature.

The inclusion of a dye is especially useful in compositions to be used in the treatment of seeds since it provides a means for marking clearly those seeds that have been treated. Dyes such as the water-soluble rhodamine dyes can, for example, be included. Also the water and alcohol-soluble chrysoidine and methyl violet dyes can be used.

The fungicidal compositions may also contain a base such as ammonia, amines or sodium hydroxide.

The fungicidal method of my invention comprises applying in an amount sufficient to exert fungicidal action a lower organo mercury hydroxyalkyl polymercaptan. The dosage of active ingredient employed is largely determined by and dependent upon the particular fungicidal compound selected, and, in the case of application to vegetation, the susceptibility of the particular vegetation to the compound selected, the state and conditions of growth of the vegetation to be treated, and the climatic conditions.

The invention is further illustrated by the following examples:

Example 1

A solution containing 25 grams of ethylmercury hydroxide in 100 ml. of methanol is prepared. To this solution is added 6.3 grams of 2,3-dimercaptopropanol. The mixture is agitated vigorously for about 10 minutes. The 3-hydroxypropylene bis(ethylmercury mercaptide) produced from these reactants is then isolated by evaporation of the methanol solvent.

The resultant compound is then formulated into a fungicidal composition of the following ingredients:

| | Percent |
|---|---|
| 3 - hydroxypropylene bis(ethylmercury mercaptide) | 4.0 |
| Water | 45.5 |
| Ethanol | 20.0 |
| Ethylene glycol | 30.0 |
| Rhodamine dye | 0.5 |

This solution, when sprayed upon wheat seed at a dosage of ¾ oz. of solution per bushel of seed, is highly effective in controlling fungus growth on the seed.

Example 2

2,3,4-trihydroxypentamethylenebis(ethylmercury mercaptide) is prepared in accordance with the procedure set forth in Example 1 but using a molar equivalent amount of 2,3,4-trihydroxy-1,5-dimercaptopentamethylene in place of the 2,3-dimercaptopropanol employed in Example 1.

The resultant compound is then formulated into a fungicidal composition of the following ingredients:

| | Percent |
|---|---|
| 2,3,4 - trihydroxypentamethylenebis(ethylmercury mercaptide) | 4.0 |
| Water | 45.5 |
| Ethylene glycol | 50.0 |
| Rhodamine dye | 0.5 |

This solution when applied to flax seed at the rate of 3 oz. of solution per bushel of seed is highly effective in controlling fungus growth on the seed.

Example 3

2,2 - bis(hydroxymethyl)trimethylenebis(ethylmercury mercaptide) is prepared in accordance with the procedure set forth in Example 1 but using a molar equivalent amount of 2,2-bis(hydroxymethyl)-1,5-dimercaptotrimethylene in place of the 2,3-dimercaptopropanol employed in Example 1.

The resultant compound is then formulated into a fungicidal composition of the following ingredients:

| | Percent |
|---|---|
| 2,2 - bis(hydroxymethyl)trimethylenebis(ethylmercury mercaptide) | 10 |
| Ethanol | 45 |
| Water | 45 |

This solution when added to wet paper pulp at the rate of ¼ pound per ton of pulp is effective in controlling slime producing organisms.

Example 4

1 - (9 - hydroxynonyl) - 2 - heptylethylenebis(ethylmercury mercaptide) is prepared in accordance with the procedure set forth in Example 1 but using a molar equivalent amount of 1-(9-hydroxynonyl)-2-heptyl-1,2-dimercaptoethylene in place of the 2,3-dimercaptopropanol employed in Example 1.

The resultant compound is then formulated into a fungicidal composition of the following ingredients:

| | Percent |
|---|---|
| 1 - (9 - hydroxynonyl) - 2 - heptylethylenebis(ethylmercury mercaptide) | 1.0 |
| Isopropanol | 98.8 |
| Rhodamine dye | 0.2 |

This solution when sprayed upon wheat seed at a dosage of 4 oz. of solution per bushel of seed is highly effective in controlling fungus growth on the seed.

Example 5

1 - (9 - hydroxynonyl)ethylenebis(ethylmercury mercaptide) is prepared in accordance with the procedure set forth in Example 1 but using a molar equivalent amount of 1-(9-hydroxynonyl)-1,2-dimercaptoethylene in place of the 2,3-dimercaptopropanol employed in Example 1.

The resultant compound is then formulated into a fungicidal composition of the following ingredients:

| | Percent |
|---|---|
| 1 - (9 - hydroxynonyl)ethylenebis(ethylmercury mercaptide) | 2.0 |
| Isopropanol | 97.7 |
| Rhodamine dye | 0.3 |

This solution when applied to flax seed at the rate of 6 oz. per bushel of seed is highly effective in controlling fungus growth on the seed.

Example 6

4 - (hydroxymethyl) - 1,2,3 - cyclohexanetris(ethylmercury mercaptide) is prepared in accordance with Example 1 but using a molar equivalent amount of 1,2,3-trimercapto-4-(hydroxymethyl)cyclohexane in place of the 2,3-dimercaptopropanol employed in Example 1.

The 4-(hydroxymethyl)-1,2,3-cyclohexanetris(ethylmercury mercaptide) is then formulated into a fungicidal composition by substituting it for the fungicidally active ingredient of the formulation of Example 5. This composition is highly effective when applied at a dosage of 6 oz. per bushel of seed in controlling fungus growth on flax seed.

Example 7

3 - hydroxypropylenebis(methylmercury mercaptide) is prepared in accordance with the procedure set forth in Example 1 but using a molar equivalent amount of methylmercury hydroxide in place of the ethylmercury hydroxide employed in Example 1.

The 3-hydroxypropylenebis(methylmercury mercaptide) is then formulated into a fungicidal composition by substituting it for the fungicidally active ingredient of the formulation of Example 1. This composition is highly effective when applied at a dosage of ¾ oz. per bushel of seed in controlling fungus growth on wheat seed.

Example 8

3-hydroxypropylenebis(phenylmercury mercaptide) is prepared in accordance with the procedure set forth in Example 1 but using a molar equivalent amount of phenylmercury hydroxide in place of the ethylmercury hydroxide employed in Example 1.

The resultant compound is then formulated into a fungicidal composition of the following ingredients:

| | Percent |
|---|---|
| 3 - hydroxypropylenebis(phenylmercury mercaptide) | 5 |
| Ethanol | 95 |

This solution when diluted at the rate of one pint per 100 gallons of water and used as a spray on apple foliage is highly effective in controlling certain fungus diseases attacking apples.

Example 9

3 - hydroxypropylenebis(isopropylmercury mercaptide) is prepared in accordance with the procedure set forth in Example 1 but using a molar equivalent amount of isopropylmercury hydroxide in place of the ethylmercury hydroxide employed in Example 1.

The 3-hydroxypropylenebis(isopropylmercury mercaptide) is then formulated into a fungicidal composition by substituting it for the fungicidally active ingredient of the formulation of Example 1. This composition is highly effective when applied at a dosage of ¾ oz. per bushel of seed in controlling fungus growth on wheat seed.

Example 10

3-hydroxypropylenebis(tert. butylmercury mercaptide) is prepared in accordance with the procedure set forth in Example 1 but using a molar equivalent amount of tert. butylmercury hydroxide in place of the ethylmercury hydroxide employed in Example 1.

The 3-hydroxypropylenebis(tert. butylmercury mercaptide) is then formulated into a fungicidal composition by substituting it for the fungicidally active ingredient of the formulation of Example 2. This composition is highly effective when applied at a dosage of 3 oz. per bushel of seed in controlling fungus growth on flax seed.

Example 11

3 - hydroxypropylenebis(allylmercury mercaptide) is prepared in accordance with the procedure set forth in Example 1 but using a molar equivalent amount of allylmercury hydroxide in place of the ethylmercury hydroxide employed in Example 1.

The 3-hydroxypropylenebis(allylmercury mercaptide) is then formulated into a fungicidal composition by substituting it for the fungicidally active ingredient of the formulation of Example 2. This composition is highly effective when applied at a dosage of 3 oz. per bushel of seed in controlling fungus growth on flax seed.

Example 12

3 - hydroxypropylenebis(methoxyethylmercury mercaptide) is prepared in accordance with the procedure set forth in Example 1 but using a molar equivalent amount of methoxyethylmercury hydroxide in place of the ethylmercury hydroxide employed in Example 1.

The 3-hydroxypropylenebis(methoxyethylmercury mercaptide) is then formulated into a fungicidal composition by substituting it for the fungicidally active ingredient of the formulation of Example 1. This composition is highly effective when applied at a dosage of ¾ oz. per bushel of seed in controlling fungus growth on wheat seed.

Example 13

3-hydroxypropylenebis(hydroxyphenylmercury mercaptide) is prepared in accordance with the procedure set forth in Example 1 but using a molar equivalent amount of hydroxyphenylmercury hydroxide in place of the ethylmercury hydroxide employed in Example 1.

The 3 - hydroxypropylenebis(hydroxyphenylmercury mercaptide) is then formulated into a fungicidal composition by substituting it for the fungicidally active ingredient of the formulation of Example 8. This composition when diluted at the rate of one pint per 100 gallons of water and used as a spray on apple foliage is highly effective in controlling certain fungus diseases attacking apples.

Example 14

3 - hydroxypropylenebis(cyanopentylmercury mercaptide) is prepared in accordance with the procedure set forth in Example 1 but using a molar equivalent amount of cyanopentylmercury hydroxide in place of the ethylmercury hydroxide employed in Example 1.

The 3-hydroxypropylenebis(cyanopentylmercury mercaptide) is then formulated into a fungicidal composition by substituting it for the fungicidally active ingredient of the formulation of Example 4. This composition is highly effective when applied at a dosage of 4 oz. per bushel of seed in controlling fungus growth on wheat seed.

Example 15

3 - hydroxypropylenebis(chloroethylmercury mercaptide) is prepared in accordance with the procedure set forth in Example 1 but using a molar equivalent amount of chloroethylmercury hydroxide in place of the ethylmercury hydroxide employed in Example 1.

The 3-hydroxypropylenebis(chloroethylmercury mercaptide) is then formulated into a fungicidal composition by substituting it for the fungicidally active ingredient of the formulation of Example 4. This composition is highly effective when applied at a dosage of 4 oz. per bushel of seed in controlling fungus growth on wheat seed.

Example 16

3-hydroxypropylenebis(hydroxycylohexylmercury mercaptide) is prepared in accordance with the procedure set forth in Example 1 but using a molar equivalent amount of hydroxycyclohexylmercury hydroxide in place of the ethylmercury hydroxide employed in Example 1.

The 3 - hydroxypropylenebis(hydroxycyclohexyl - mercury mercaptide) is then formulated into a fungicidal composition by substituting it for the fungicidally active ingredient of the formulation of Example 3. This composition is highly effective when added to wet paper pulp at the rate of ¼ pound per ton of pulp in controlling slime producing organisms.

Example 17

A solution containing 2 parts by weight of ethylmercury acetate and 97.75 parts by weight of ethanol is prepared. To this solution is added 0.25 part by weight of 2,3-dimercaptopropanol, the molar equivalent to 58% of the ethylmercury acetate, and the solution is stirred vigorously.

After reaction, the solution comprises 3-hydroxypropylenebis(ethylmercury mercaptide), ethylmercury acetate and acetic acid.

The thusly prepared solution is then applied to flax seed at a dosage of 3 oz. of solution per bushel of seed. The seeds are then planted and, after allowing sufficient time for the seeds to germinate and the plants to emerge from the soil, a stand count is made. The thusly treated flax seed gives a stand count of 1.8 times that of untreated flax seed.

To another sample of the above solution is added 20% by weight of ethylene glycol and 1% by weight of rhodamine dye. The resultant composition therefore comprises 3-hydroxypropylenebis(ethylmercury mercaptide), ethylmercury acetate, acetic acid, ethylene glycol and rhodamine dye. This solution, when applied to wheat seed at a dosage of 1 oz. of solution per bushel of seed, is highly effective in preventing fungus growth on the seed.

Example 18

A solution containing 2 parts by weight of ethylmercury hydroxide and 97.6 parts by weight of ethanol is prepared. To this solution is added 0.4 part by weight of 2,3-dimercaptopropanol. The mixture is agitated vigorously for about ten minutes. After reaction, the solution comprises 3 - hydroxypropylenebis(ethylmercury mercaptide) and ethylmercury hydroxide.

The reacted solution is highly effective in controlling fungus growth upon flax seed when applied at a dosage of 3 oz. of solution per bushel of seed.

It is to be understood that my compounds are in no way limited in utility to those uses set forth in the examples. Rather they can be applied generally for the protection of organic matters subject to fungus infestation. Thus they can be used, for example, for the protection of carbohydrates, proteins and hydrocarbon oils. More specifically, they can be used, for example, to treat living plants such as fruit-bearing trees. Also, they can be used to treat organic fibers or fabrics and cellulosic materials such as leather and wood. Likewise, they can be used to treat paints, lubricating oils, and oil-drilling muds to protect such materials from fungus attack. Also, the compounds of the invention can be used for purposes such as slime-control in paper mills, water-cooling towers and the like. Furthermore, in more concentrated dosages certain of the lower organo mercury salts of hydroxy polymercaptans surprisingly possess herbicidal properties and therefore have some utility as herbicides and in herbicidal formulations for use in killing undesired plants.

This application is a continuation-in-part of my copending U.S. patent application Serial No. 409,771, filed February 11, 1954, now abandoned.

I claim:

1. A lower organo mercury salt of a hydroxy lower alkyl mercaptan said lower organo group being selected from the group consisting of lower aromatic, lower acyclic, lower cyclic radicals, and said hydroxy lower alkyl mercaptan containing from 2 thru 3 mercapto groups.

2. A lower alkyl mercury salt of a hydroxy lower alkyl mercaptan the carbon chain portion of said lower alkyl mercury salt being optionally substituted by one member from the class consisting of nitro, hydroxy, cyano, halo and methoxy, said hydroxy lower alkyl mercaptan containing from 2 thru 3 mercapto groups.

3. A lower alkyl mercury salt of a hydroxy lower alkyl mercaptan in which each carbon of the hydroxy lower alkyl mercaptan is substituted with one member from the class consisting of hydroxyl and mercapto groups, said hydroxy lower alkyl mercaptan containing from 2 thru 3 mercaptan groups.

4. 3-hydroxypropylenebis(ethylmercury mercaptide).

5. 3-hydroxypropylenebis(methylmercury mercaptide).

References Cited in the file of this patent

UNITED STATES PATENTS

| | | |
|---|---|---|
| 2,305,545 | Migrdichian | Dec. 15, 1942 |
| 2,471,621 | Hartman et al. | May 31, 1949 |
| 2,614,960 | Somerville | Oct. 21, 1952 |
| 2,636,045 | Halpern | Apr. 21, 1953 |